United States Patent
Ueda et al.

(10) Patent No.: US 9,758,189 B2
(45) Date of Patent: Sep. 12, 2017

(54) VEHICLE CONTROL APPARATUS

(71) Applicant: DENSO CORPORATION, Kariya, Aichi-pref. (JP)

(72) Inventors: Yusuke Ueda, Okazaki (JP); Masao Oooka, Gamagori (JP); Shotaro Fukuda, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/828,761

(22) Filed: Aug. 18, 2015

(65) Prior Publication Data

US 2016/0052544 A1 Feb. 25, 2016

(30) Foreign Application Priority Data

Aug. 19, 2014 (JP) ................. 2014-166657

(51) Int. Cl.
| | | |
|---|---|---|
| *G01C 22/00* | (2006.01) | |
| *B62D 6/00* | (2006.01) | |
| *B62D 15/02* | (2006.01) | |

(52) U.S. Cl.
CPC ........... *B62D 6/002* (2013.01); *B62D 15/025* (2013.01)

(58) Field of Classification Search
USPC ........................................................ 701/25
See application file for complete search history.

(56) References Cited

U.S. PATENT DOCUMENTS

| | | | | |
|---|---|---|---|---|
| 2002/0095246 A1* | 7/2002 | Kawazoe | ............. | G05D 1/0246 701/1 |
| 2004/0215393 A1* | 10/2004 | Matsumoto | ......... | B60T 8/17557 701/300 |
| 2005/0278112 A1 | 12/2005 | Gern et al. | | |
| 2007/0096557 A1* | 5/2007 | Tamai | ..................... | B60T 7/122 303/191 |
| 2009/0287376 A1* | 11/2009 | Aso | ........................ | B60W 10/12 701/42 |
| 2011/0320163 A1* | 12/2011 | Markkula | ........... | B60W 40/076 702/150 |
| 2012/0116665 A1* | 5/2012 | Aoki | ................... | B60T 8/17558 701/301 |
| 2014/0005889 A1* | 1/2014 | Hayakawa | ....... | B60G 17/01933 701/38 |

FOREIGN PATENT DOCUMENTS

| | | |
|---|---|---|
| JP | 2005-247158 A | 9/2005 |
| JP | 2006-126980 A | 5/2006 |

* cited by examiner

*Primary Examiner* — Muhammad Shafi
(74) *Attorney, Agent, or Firm* — Knobbe, Martens, Olson & Bear, LLP (57) ABSTRACT

A vehicle control apparatus includes a steering amount calculation unit which calculates a steering amount for decreasing a lateral deviation of a vehicle with respect to a target route, a vehicle position acquisition unit which acquires a position of the vehicle, and a past information acquisition unit which acquires the lateral deviation, which is related to the position of the vehicle acquired by the vehicle position acquisition unit or a position ahead of the position of the vehicle, from a storage section in which the lateral deviation is stored with the position of the vehicle being related to the lateral deviation. The steering amount calculation unit feeds back the lateral deviation acquired by the past information acquisition unit to calculate the steering amount.

8 Claims, 7 Drawing Sheets

VEHICLE CONTROL APPARATUS

CROSS-REFERENCE TO RELATED APPLICATION

This application is based on and claims the benefit of priority from earlier Japanese Patent Application No. 2014-166657 filed Aug. 19, 2014, the description of which is incorporated herein by reference.

BACKGROUND

Technical Field

The present invention relates to a vehicle control apparatus.

Related Art

A vehicle control apparatus is known which assists a driver in steering so as to keep the vehicle running in a lane (refer to JP-A-2005-247158).

A line on which a vehicle runs is affected by a cross slope of the road. Thus, according to the technique disclosed in JP-A-2005-247158, data of cross slopes of roads is previously stored in a storage unit so as to correspond to each road curvature. Then, the data stored in the storage unit is used to estimate a cross slope depending on the road curvature and further to calculate the steering amount based on the cross slope.

According to the technique disclosed in JP-A-2005-247158, special data, in which cross slopes of roads and road curvatures are related to each other, is required to be previously provided in the vehicle control apparatus.

SUMMARY

An embodiment provides a vehicle control apparatus which can calculate a steering amount without data, in which cross slopes of roads and road curvatures are related to each other.

As an aspect of the embodiment, a vehicle control apparatus is provided which includes: a steering amount calculation unit which calculates a steering amount for decreasing a lateral deviation of a vehicle with respect to a target route; a vehicle position acquisition unit which acquires a position of the vehicle; and a past information acquisition unit which acquires the lateral deviation, which is related to the position of the vehicle acquired by the vehicle position acquisition unit or a position ahead of the position of the vehicle, from a storage section in which the lateral deviation is stored with the position of the vehicle being related to the lateral deviation. The steering amount calculation unit feeds back the lateral deviation acquired by the past information acquisition unit to calculate the steering amount.

DETAILED DESCRIPTION OF THE PREFERRED EMBODIMENTS

With reference to the accompanying drawings, hereinafter are described embodiments of the present invention.

First Embodiment

1. Configuration of Vehicle Control Apparatus 1

Figure 1:
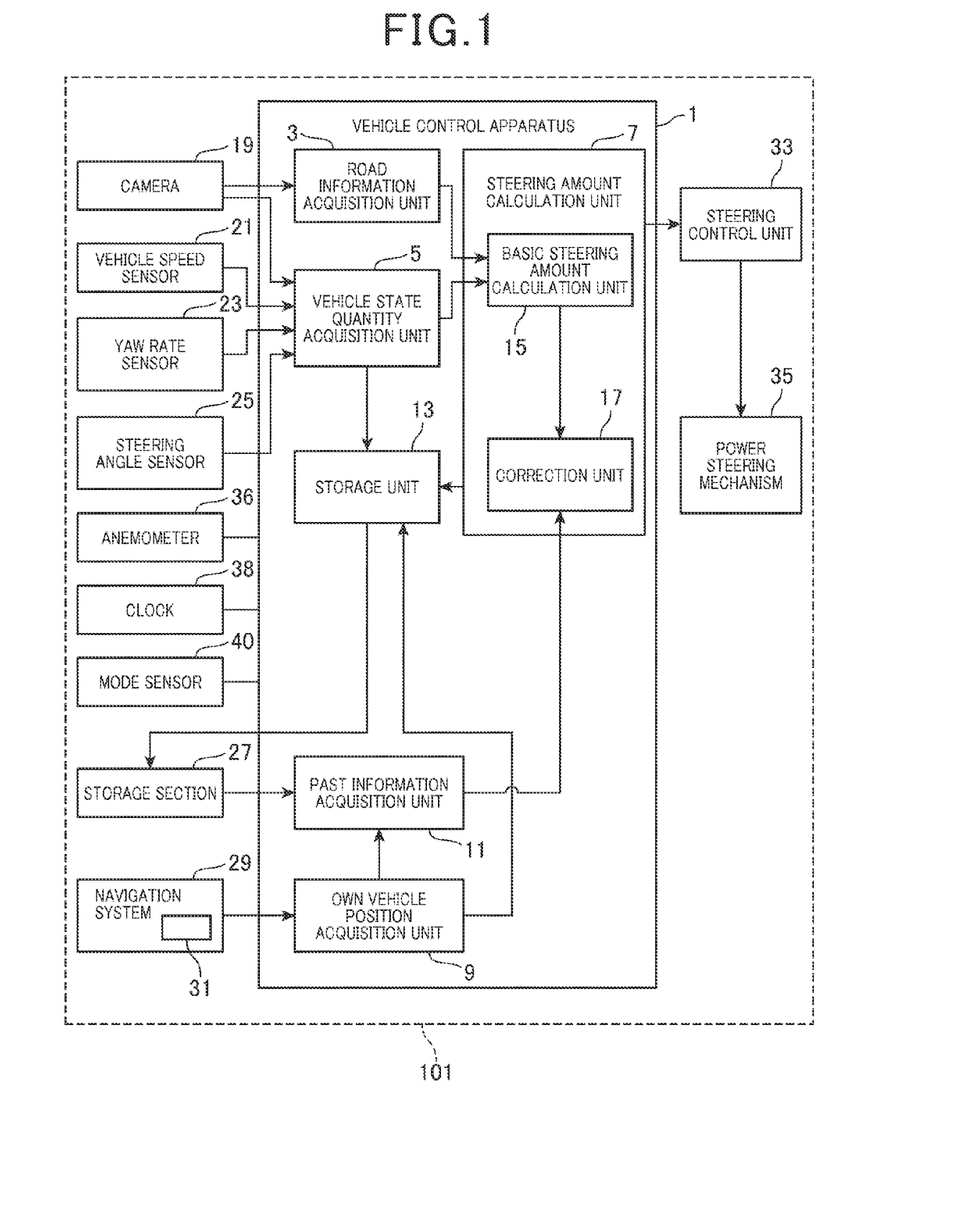
FIG. 1 is a block diagram showing a configuration of a vehicle control apparatus.
Figure 4:
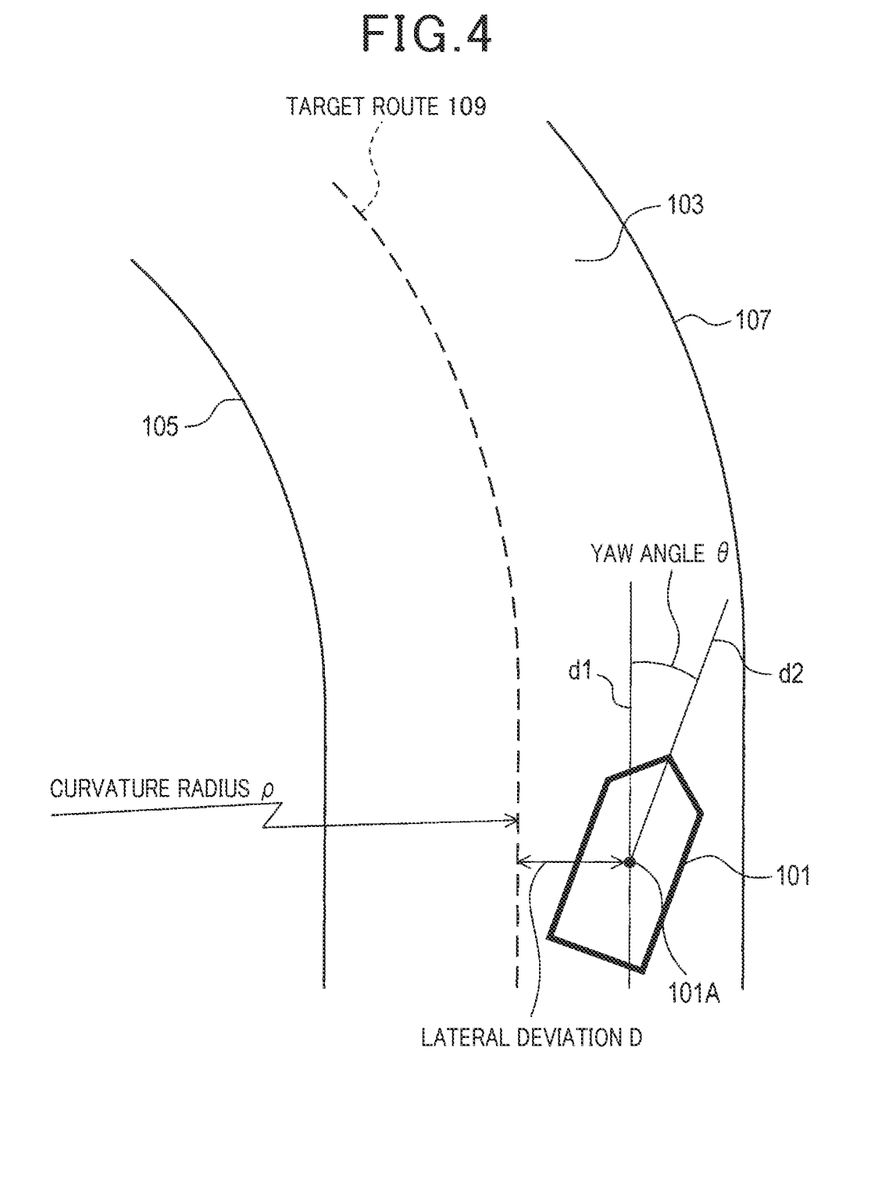
FIG. 4 is an explanatory drawing showing a vehicle state quantity and road information.
Figure 5:
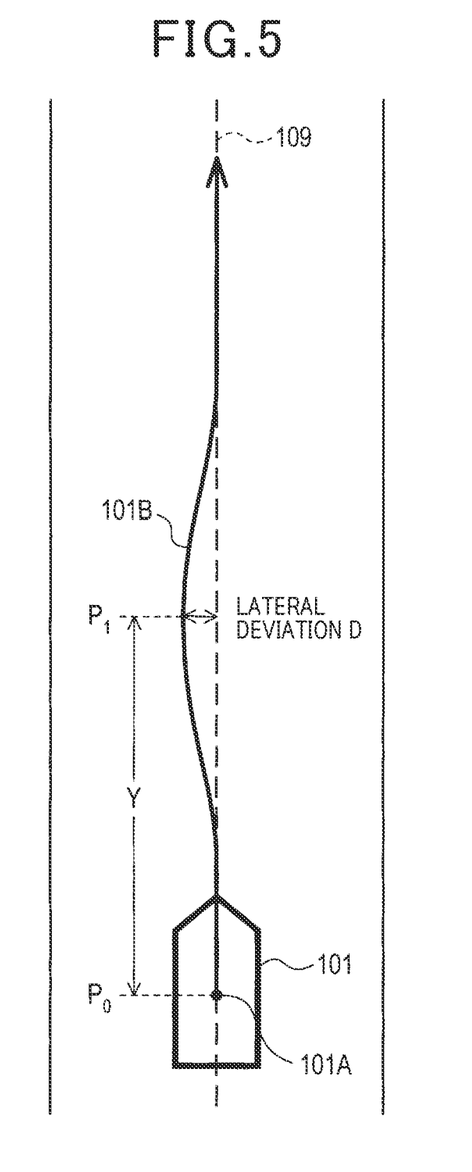
FIG. 5 is an explanatory drawing showing a lateral deviation.

The configuration of the vehicle control apparatus 1 is described with reference to FIG. 1 and FIG. 4. The vehicle control apparatus 1 is an in-vehicle apparatus installed in a vehicle. Hereinafter, the vehicle in which the vehicle control apparatus 1 is installed is referred to as an own vehicle 101. In the own vehicle 101, an automatic driving mode can be set. When the automatic driving mode is set, the own vehicle 101 runs along a target route while automatically steering.

When the automatic driving mode is set in the own vehicle 101, the vehicle control apparatus 1 calculates the steering amount $\delta t2$ for decreasing a lateral deviation D of the own vehicle 101 with respect to the target route. As shown in FIG. 4, the lateral deviation D is a distance between the center 101A of the own vehicle 101 and a target route 109 in the lateral direction (the direction perpendicular to the travelling direction of the road). The own vehicle 101 automatically steers using the steering amount $\delta t2$ calculated by the vehicle control apparatus 1.

The vehicle control apparatus 1 is a known computer including a CPU, a RAM, and a ROM. In the computer (ROM), a program for performing a process described later is installed. The vehicle control apparatus 1 includes a road information acquisition unit 3, a vehicle state quantity acquisition unit 5, a steering amount calculation unit 7, an own vehicle position acquisition unit 9, a past information acquisition unit 11, and a storage unit 13, as functions.

In addition, the steering amount calculation unit 7 includes a basic steering amount calculation unit 15, and a correction unit 17. The vehicle state quantity acquisition unit 5 also has a function as a lateral deviation detection unit detecting the lateral deviation D. Detailed processes performed by the units are described later.

The own vehicle 101 includes, in addition to the vehicle control apparatus 1, a camera 19, a vehicle speed sensor 21, a yaw rate sensor 23, a steering angle sensor 25, a storage section 27, and a navigation system 29.

The camera 19 is provided at a front part of the own vehicle 101 (e.g. in the vehicle interior and ahead of a rearview mirror). The camera 19 captures an image of a road ahead of the own vehicle 101 and outputs image information to the vehicle control apparatus 1. The vehicle speed sensor 21, the yaw rate sensor 23, and the steering angle sensor 25 respectively detect vehicle speed, a yaw rate, and a steering angle of the own vehicle 101 and output the detection results to the vehicle control apparatus 1.

The storage section 27 is configured by a hard disk drive (HDD) and can write, store, and read information. The storage section 27 stores a lateral deviation D' detected in the past, a steering amount $\delta t2'$ obtained when the lateral deviation D' is generated, and a position of the vehicle (which may be the own vehicle 101 or another vehicle)

obtained when the lateral deviation D' is generated. The lateral deviation D', the steering amount δt2', and the position of the vehicle are related to each other. Hereinafter, the information in which the lateral deviation D', the steering amount δt2, and the position of the vehicle are related to each other serve as lateral deviation related information. For example, when values of the lateral deviation D', the steering amount δt2', and the position P of the vehicle in the lateral deviation related information are respectively X, Y, and Z, it means that when the position P of the vehicle was Z in the past, the value of the lateral deviation D' was X, and the value of steering amount δt2' was Y.

The navigation system 29 has a function of detecting an absolute position (position indicated by latitude and longitude) of the own vehicle 101. In addition, the navigation system 29 includes a map database 31. The map database 31 includes information on positions, shapes (including curvature radiuses), widths and the like. The navigation system 29 can specify the position of the own vehicle 101 on the map data based on the absolute position of the own vehicle 101 detected by the GPS, and the map database 31. Hereinafter, the position of the own vehicle 101 on the map data is defined as the position of the own vehicle 101.

In addition, the own vehicle 101 includes, in addition to the vehicle control apparatus 1, a steering control unit 33 and a power steering mechanism 35. The steering control unit 33 acquires the steering amount δt2 calculated by the vehicle control apparatus 1. The steering control unit 33 and a steering shaft connected to a steering wheel of the own vehicle 101 can be connected to and disconnected from each other by an electromagnetic clutch, which is not shown.

When the automatic driving mode is set in the own vehicle 101, the electromagnetic clutch is connected. In this case, the steering control unit 33 applies steering torque corresponding to the steering amount δt2 to the steering shaft. The power steering mechanism 35 assists steering force according to the steering torque applied to the steering shaft. As a result, when the automatic driving mode is set in the own vehicle 101, the steering force is assisted according to the steering amount δt2 calculated by the vehicle control apparatus 1, whereby the own vehicle 101 automatically runs along the target route.

Meanwhile, when the automatic driving mode is not set in the own vehicle 101, the electromagnetic clutch is not connected. In this case, the steering control unit 33 does not apply steering torque corresponding to the steering amount δt2 to the steering shaft.

The own vehicle 101 includes, in addition to the vehicle control apparatus 1, an anemometer 36 which measures a wind velocity and a direction of the wind, a clock 38 which measures time, and a mode sensor 40 which detects whether or not the automatic driving mode is set.

2. Process Performed by Vehicle Control Apparatus 1

The process performed by the vehicle control apparatus 1 is described with reference to FIG. 2 to FIG. 5. This process is repeatedly performed at predetermined intervals while the automatic driving mode is set in the own vehicle 101.

Figure 2:
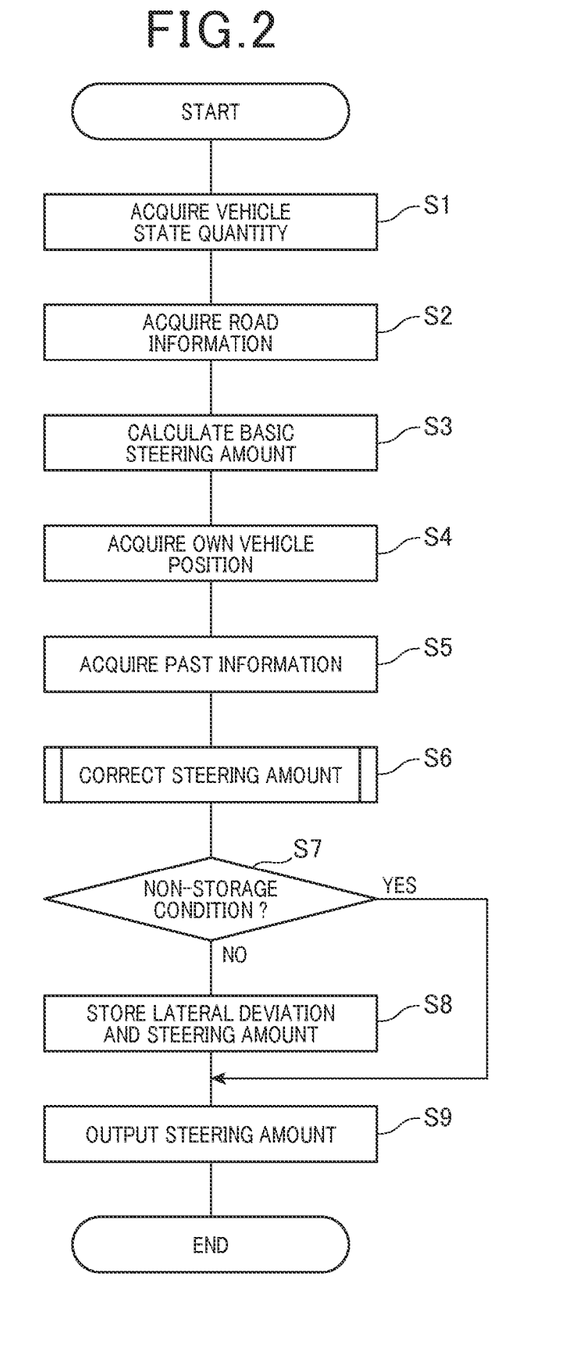
FIG. 2 is a flowchart of a process performed by the vehicle control apparatus.

In step 1 of FIG. 2, the vehicle state quantity acquisition unit 5 acquires vehicle state quantities. The vehicle state quantities are state quantities regarding a state of the own vehicle 101. Specifically, the vehicle state quantities include vehicle speed, a yaw rate, a steering angle, a lateral deviation D, and a yaw angle A. The vehicle speed, the yaw rate, and the steering angle are respectively acquired from the vehicle speed sensor 21, the yaw rate sensor 23, and the steering angle sensor 25.

The lateral deviation D is acquired as follows. First, an image ahead of the own vehicle 101 is acquired by using the camera 19. As shown in FIG. 4, right and left white lines 105, 107 of a lane 103 on which the own vehicle 101 is running are recognized. To recognize the white lines 105, 107, a known method can be used. For example, points whose luminance variation is larger in the image are extracted as edge points to recognize approximate curves passing through the edge points as the white lines 105, 107. Then, the curve passing through the intermediate point between the white lines 105 and 107 is defined as a target route 109. Finally, the distance between the center 101A of the own vehicle 101 and the target route 109 in the lateral direction (the direction perpendicular to the travelling direction of the road) is calculated to define the distance as the lateral deviation D.

The yaw angle θ is an angle between the direction d1 of the target route 109 and the longitudinal direction d2 of the own vehicle 101 at the position of the own vehicle 101. By determining the direction d1 and the direction d2 in an image obtained by the camera 19, the yaw angle θ can be acquired as an angle between the direction d1 and the direction d2.

In step 2, the road information acquisition unit 3 acquires road information. The road information regards the road on which the own vehicle 101 is running. Specifically, the road information is a curvature radius ρ of the road at the position of the own vehicle 101. The curvature radius ρ can be acquired from the image obtained by the camera 19.

In step 3, the basic steering amount calculation unit 15 calculates a basic steering amount δt1 from the vehicle state quantity acquired in the step 1 and the road information acquired in the step 2. Specifically, the basic steering amount δt1 is calculated by the following expression (1). The basic steering amount δt1 is the steering amount obtained before correction is made in step 6 described later. In addition, the basic steering amount δt1 is the steering amount corresponding to a position (hereinafter, referred to as a forward position P1) ahead of the position of the own vehicle at the time by a predetermined distance Y.

$$\delta t1 = K1 \cdot \rho + K2 \cdot D + K3 \cdot \theta \qquad (1)$$

In the expression (1), K1 to K3 are control gains and constants.

In step 4, the own vehicle position acquisition unit 9 acquires the position P0 of the own vehicle at the time by using the navigation system 29.

In step 5, the past information acquisition unit 11 acquires lateral deviation related information (including the lateral deviation D' generated at the forward position P1 in the past and the steering amount δt2' obtained when the lateral deviation D' is generated) at the forward position P1 (refer to FIG. 5) ahead of the position P0 of the own vehicle acquired in the step 4 by the predetermined distance Y from the storage section 27. Note that, in FIG. 5, 101B indicates a track drawn by the center 101A of the own vehicle 101 in the past.

In step 6, the correction unit 17 corrects the basic steering amount δt1 calculated in the step 3 based on the lateral deviation related information acquired in the step 5 to calculate the steering amount δt2. This process is explained with reference to FIG. 3.

Figure 3:
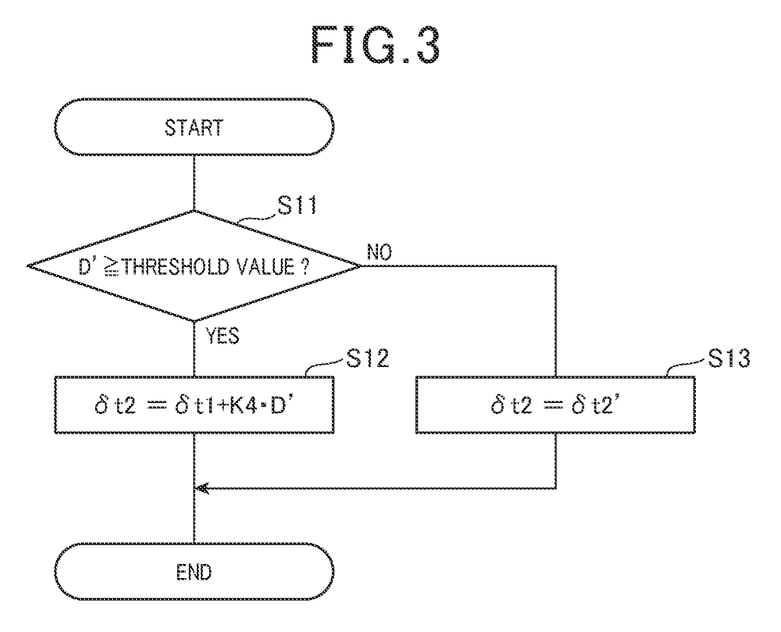
FIG. 3 is a flowchart of a steering amount correction process performed by the vehicle control apparatus.

In step 11 of FIG. 3, it is determined whether the lateral deviation D' acquired in the step 5 is equal to or more than a predetermined threshold value. If the lateral deviation D' is equal to or more than the threshold value, the process proceeds to step 12. If the lateral deviation D' is less than the threshold value, the process proceeds to step 13.

In step 12, the steering amount δt2 is calculated by the following expression (2).

$$\delta t2 = \delta t1 + K4 \cdot D' \quad (2)$$

In the expression (2), K4 is a control gain and a constant. Note that the process based on the expression (2) is an example of the process in which the correction amount having magnitude corresponding to the magnitude of the lateral deviation D' (the amount obtained by multiplying K4 by D') is added to the basic steering amount δt1 to calculate the steering amount δt2. In addition, the process based on the expression (2) is an example of the process in which the lateral deviation D' included in the lateral deviation related information acquired in the step 5 is fed back, thereby further decreasing the lateral deviation D at the forward position P1.

Meanwhile, in step 13, the steering amount δt2 is calculated by the following expression (3).

$$\delta t2 = \delta t2' \quad (3)$$

In the expression (3), the steering amount δt2' obtained when the lateral deviation D' was generated in the past is used as the steering amount δt2 at the present time.

Returning to FIG. 2, in step 7, the storage unit 13 determines whether or not the state of the own vehicle 101 and around the own vehicle 101 corresponds to a previously set non-storage condition at the time. Specifically, following is the non-storage condition.

(J1) The force of the side wind is equal to or more than a predetermined threshold value.

(J2) Accuracy in recognizing the white lines 105, 107 is lower. For example, the weather is foggy, cloudy, or rainy. Alternatively, the time period corresponds to evening or night.

(J3) The driver of the own vehicle 101 performed steering within a predetermined period of time in the past.

(J4) The automatic driving mode is set to an off state.

(J5) The yaw rate of the own vehicle 101 is equal to or more than a predetermined threshold value.

Note that the force of the side wind can be measured by the anemometer 36. The weather can be determined from images captured by the camera 19. The time period can be determined based on the time detected by the clock 38. Whether or not the driver performed steering can be determined by comparing the steering amount δt2 calculated by the vehicle control apparatus 1 with the detection result of the steering angle sensor 25. Whether or not the automatic driving mode is set to an off state can be determined by the mode sensor 40. The yaw rate can be measured by the yaw rate sensor 23.

If the state of the own vehicle 101 and around the own vehicle 101 does not correspond to any of the conditions (J1) to (J5), the process proceeds to step 8. If the state of the own vehicle 101 and around the own vehicle 101 corresponds to at least one of the conditions (J1) to (J5), the process proceeds to step 9.

In step 8, the storage unit 13 acquires the lateral deviation D at the time from the vehicle state quantity acquisition unit 5. The storage unit 13 acquires the steering amount δt2 at the time from the steering amount calculation unit 7. The storage unit 13 acquires the position P0 of the own vehicle at the time from the own vehicle position acquisition unit 9.

Then, the storage unit 13 stores the information (lateral deviation related information), in which the obtained lateral deviation D, steering amount δt2, and position P0 of the own vehicle are related to each other, in the storage section 27. Note that the stored lateral deviation related information can be used in the process of the step 5 in the future. When using the lateral deviation related information in the step 5 in the future, the lateral deviation D stored in the present step becomes the lateral deviation D', and the steering amount δt2 stored in the present step becomes the steering amount δt2'.

In step 9, the steering amount δt2 calculated in the step 6 is outputted to the steering control unit 33. Note that the steering control unit 33 uses the outputted steering amount δt2 at the timing when the own vehicle 101 reaches the forward position P1.

3. Advantages Provided by Vehicle Control Apparatus 1

(1A) Even when the vehicle control apparatus 1 does not necessarily include special data (e.g. data in which the cross slope of the road and the road curvature are related to each other), the steering amount δt2 can be accurately calculated.

Figure 6:
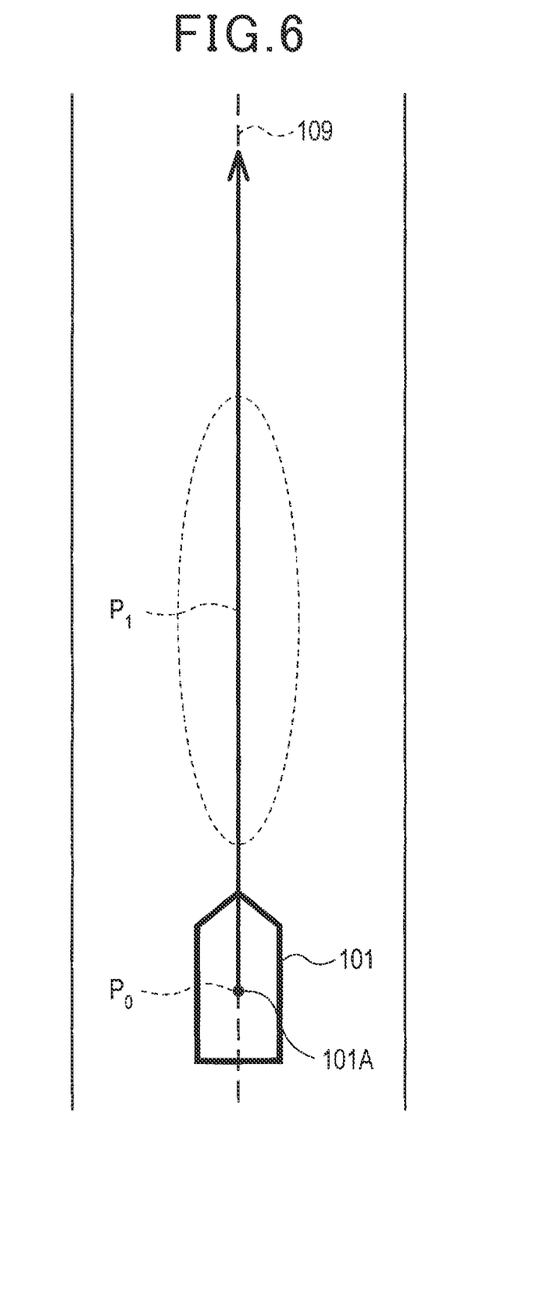
FIG. 6 is an explanatory drawing showing an effect of a lateral deviation decrease provided by the vehicle control apparatus.

(1B) The vehicle control apparatus 1 feeds back the past lateral deviation D' obtained at the position (forward position P1) through which the own vehicle 101 will run, to calculate the steering amount δt2 obtained at the forward position P1. Thus, as shown in FIG. 6, the lateral deviation D at the forward position P1 can be further decreased.

(1C) The vehicle control apparatus 1 can generate the lateral deviation related information to store the lateral deviation related information in the storage section 27. The vehicle control apparatus 1 can calculate the steering amount δt2 by using the lateral deviation related information stored in the storage section 27. Hence, the steering amount δt2 can be calculated more easily by using the lateral deviation related information.

(1D) If the state of the own vehicle 101 and around the own vehicle 101 corresponds to the previously set non-storage condition, the vehicle control apparatus 1 does not store the lateral deviation related information in the storage section 27. Hence, storing the lateral deviation related information having lower reliability, which makes the calculation of the steering amount δt2 inaccuracy, can be prevented. As a result, the control performance and the reliability of the vehicle control apparatus 1 are further improved.

(1E) The vehicle control apparatus 1 calculates the basic steering amount δt1 from the vehicle state quantity related to the state of the own vehicle and the road information. The vehicle control apparatus 1 further corrects the basic steering amount δt1 based on the lateral deviation related information acquired by the past information acquisition unit 11 to calculate the steering amount δt2. Hence, the steering amount δt2 can be calculated more easily.

(1F) If the lateral deviation D' acquired by the past information acquisition unit 11 is equal to or more than a predetermined threshold value, the vehicle control apparatus 1 adds the correction amount having magnitude corresponding to the magnitude of the lateral deviation D' to the basic steering amount δt1 to calculate the steering amount δt2. In addition, if the lateral deviation D' acquired by the past information acquisition unit 11 is less than the predetermined threshold value, the steering amount δt2' acquired by the past information acquisition unit 11 is used as the steering amount δt2 at the present time. Hence, the steering amount δt2 can be easily calculated according to the magnitude of the lateral deviation D'.

Second Embodiment

1. Configuration of Vehicle Control Apparatus 1 and Process Performed by Vehicle Control Apparatus 1

In the present embodiment, the configuration of the vehicle control apparatus 1 and the process performed by the vehicle control apparatus 1 are basically similar to those of the first embodiment. Hereinafter, explanations of the parts common to the present embodiment and the first embodiment are omitted to mainly explain the difference between the present embodiment and the first embodiment.

Figure 7:
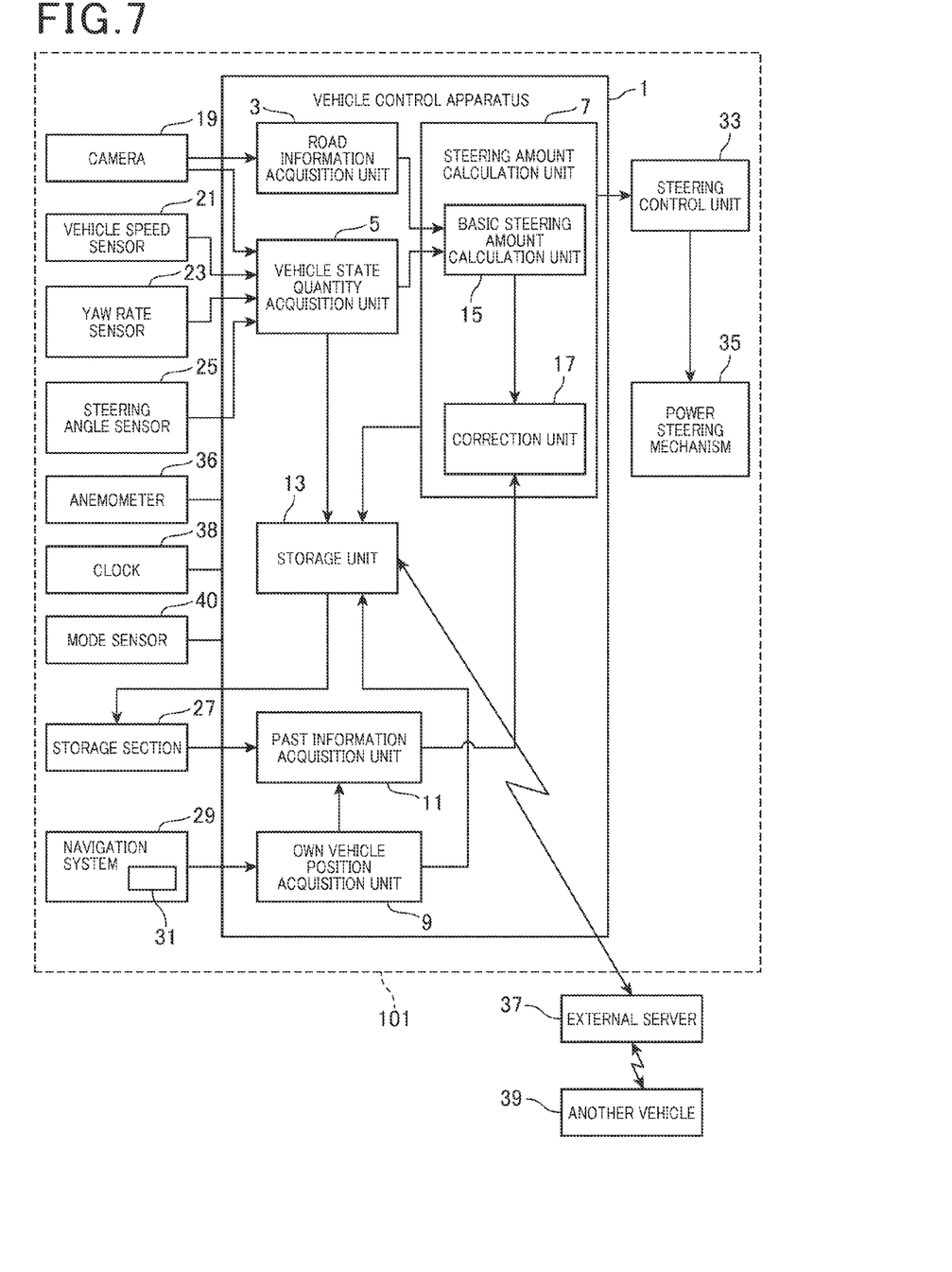
FIG. 7 is a block diagram showing a configuration of a vehicle control apparatus.

The vehicle control apparatus 1 of the present embodiment has a configuration shown in FIG. 7. The storage unit 13 can perform radio communication with an external server 37 present outside the own vehicle 101. The external server 37 can also perform radio communication with another vehicle 39 and stores lateral deviation related information (information in which the lateral deviation D' generated in the vehicle 39, the steering amount δt2' in the vehicle 39 obtained when the lateral deviation D' is generated, and the position of the vehicle 39 obtained when the lateral deviation D' is generated are related to each other) received from the vehicle 39. Hereinafter, the stored information is defined as the lateral deviation related information of the vehicle 39.

The storage unit 13 periodically acquires the lateral deviation related information of the vehicle 39 from the vehicle 39 and stores the lateral deviation related information in the storage section 27. As a result, the storage section 27 holds, in addition to the lateral deviation related information regarding the lateral deviation of the own vehicle 101, the lateral deviation related information of the vehicle 39.

In the process of the step 5 (refer to FIG. 2), the past information acquisition unit 11 acquires the lateral deviation related information at the forward position P1 from the storage section 27. This lateral deviation related information may be the lateral deviation related information concerning the lateral deviation of the own vehicle 101 or the lateral deviation related information concerning the vehicle 39.

In addition, the storage unit 13 transmits the lateral deviation related information, which is stored in the storage section 27, concerning the lateral deviation of the own vehicle 101 to the external server 37.

2. Advantages Provided by Vehicle Control Apparatus 1

The vehicle control apparatus 1 of the present embodiment can provide, in addition to the advantages (1A) to (1F) of the first embodiment, the following advantages.

(2A) The storage section 27 holds, in addition to the lateral deviation related information concerning the lateral deviation of the own vehicle 101, the lateral deviation related information of the vehicle 39. Hence, even when the lateral deviation related information concerning the lateral deviation of the own vehicle 101 is not stored in the storage section 27, the steering amount δt2 can be calculated by using the lateral deviation related information of the vehicle 39. As a result, the control performance and the reliability of the vehicle control apparatus 1 are further improved.

(2B) The storage unit 13 transmits the lateral deviation related information, which is stored in the storage section 27, concerning the lateral deviation of the own vehicle 101 to the external server 37. Hence, the vehicle 39 can use the lateral deviation related information.

Other Embodiments (1) In the step 6 of the first and second embodiments, a plurality pieces of lateral deviation related information related to a predetermined range including the position P1 can be acquired to calculate a variation (e.g. standard deviation) of the lateral deviation D' included in the plurality pieces of lateral deviation related information. Then, when the variation is equal to or more than a predetermined threshold value, the contribution of the lateral deviation D' in the correction of the basic steering amount δt1 can be smaller than that in the case where the variation is less than the predetermined threshold value.

In addition, when the number of the plurality pieces of lateral deviation related information related to the predetermined range including the position P1 is equal to or less than a predetermined threshold value, the contribution of the lateral deviation D' in the correction of the basic steering amount δt1 can be smaller than that in the case where the number of the plurality pieces of lateral deviation related information related to the predetermined range including the position P1 is more than the predetermined threshold value.

In addition, when the variation of the lateral deviation D' is equal to or more than the predetermined threshold value or the number of the plurality of pieces of lateral deviation related information is equal to or less than the predetermined threshold value, the contribution of the lateral deviation D' in the correction of the basic steering amount δt1 can be smaller than that in the case where the variation of the lateral deviation D' is less than the predetermined threshold value and the number of the plurality of pieces of lateral deviation related information is more than the predetermined threshold value.

Accordingly, the influence on the steering amount δt2 by the lateral deviation related information having lower reliability can be smaller. As a result, the reliability of the vehicle control apparatus 1 is further improved.

According to a specific example of a method for reducing the contribution of the lateral deviation D', for example, the process of the step 6 is not performed, but the basic steering amount δt1 calculated in the step 3 is used as the final steering amount δt2.

In addition, according to a specific example of a method for making smaller the contribution of the lateral deviation D', for example, in the expression (2), the value (absolute value) of K4 is made smaller than usual.

In addition, when the variation of the lateral deviation D' is equal to or more than the predetermined threshold value or the number of the plurality pieces of lateral deviation related information is equal to or less than the predetermined threshold value, the process for calculating the steering amount δt2 may be stopped, or the steering control may be stopped. When the process for calculating the steering amount δt2 is stopped, or the steering control is stopped, notification of the fact can be provided to the driver of the own vehicle 101.

Accordingly, using the steering amount δt2 corrected based on the lateral deviation related information having lower reliability can be avoided. As a result, the reliability of the vehicle control apparatus 1 is further improved.

(2) In the first and second embodiments, the steering amount δt2 may be calculated when the automatic driving is not performed, or the calculated steering amount δt2 may be used when the automatic driving is not performed. For example, in a state where the driver is performing driving operation, the steering amount δt2 may be calculated, and the calculated steering amount δt2 may be used for the control of assisting the steering of the driver so as to decrease the lateral deviation D.

(3) In the first and second embodiments, the own vehicle 101 may include a LIDER. In addition, in the step 1, a yaw angle and a lateral deviation may be acquired by using the LIDER.

(4) In the step 2 of the first and second embodiment, the curvature radius ρ may be acquired from the map database 31. Note that, as described above, the map database 31 stores the curvature radiuses ρ of roads.

(5) In the first and second embodiments, the vehicle control apparatus 1 may calculate the steering amount δt2 at the position P0 of the own vehicle 101 at the time.

(6) In the step S6 of the first and second embodiments, the basic steering amount δt1 may be corrected by another method. For example, not depending on the magnitude of the lateral deviation D, the process of the step 12 may be always performed. In addition, in the step 12, the steering amount δt2 may be calculated by a method of multiplying the value corresponding to the magnitude of the lateral deviation D' by the basic steering amount δt1.

(7) In the first and second embodiments, the vehicle control apparatus 1 of the own vehicle 101 may not store the lateral deviation related information regarding the lateral deviation of the own vehicle 101 in the storage section 27. In this case, the storage section 27 may store the lateral deviation related information of another vehicle 39 to be used.

(8) In the first and second embodiments, the vehicle control apparatus 1 may calculate the final steering amount δt2 in one step not through the step in which the basic steering amount δt1 is calculated.

(9) In the step 7 of the first and second embodiments, the non-storage condition may be part of (J1) to (J5). In addition, part or all of (J1) to (J5) may be replaced by other conditions.

(10) In the second embodiment, the past information acquisition unit 11 may acquire the lateral deviation related information of the vehicle 39 directly from the external server 37.

(11) In the step 13 of the first and second embodiments, the steering amount δt2 may be calculated by the expression (4).

$$\delta t2 = \delta t1 + \Delta\delta' \quad (4)$$

In the expression (4), Δδ' is a correction amount (the amount obtained by multiplying K4 by D') used when calculating the steering amount δt2' acquired by the past information acquisition unit 11.

(12) A function having one component in the first and second embodiments may be separated into a plurality of components. Alternatively, functions of a plurality of components may be integrated into one component. In addition, at least part of the configurations of the first and second embodiments may be replaced with a known configuration having the similar functions. Part of the configurations of the first and second embodiments may be omitted. At least part of the configurations of the first and second embodiments may be added to or replaced with the configuration of another embodiment.

It will be appreciated that the present invention is not limited to the configurations described above, but any and all modifications, variations or equivalents, which may occur to those who are skilled in the art, should be considered to fall within the scope of the present invention.

(13) The present invention may be realized by various aspects such as a system including the vehicle control apparatus as a component, a program for allowing a computer to function as the vehicle control apparatus, a recording medium storing the program, and a method of controlling a vehicle.

Hereinafter, aspects of the above-described embodiments will be summarized.

As an aspect of the embodiment, the vehicle control apparatus includes a steering amount calculation unit (7) which calculates a steering amount (δt2) for decreasing a lateral deviation (D) of a vehicle (101) with respect to a target route (109); a vehicle position acquisition unit (9) which acquires a position of the vehicle; and a past information acquisition unit (11) which acquires the lateral deviation, which is related to the position of the vehicle acquired by the vehicle position acquisition unit or a position ahead of the position of the vehicle, from a storage section (27) in which the lateral deviation is stored with the position of the vehicle being related to the lateral deviation.

In addition, in the vehicle control apparatus, the steering amount calculation unit feeds back the lateral deviation acquired by the past information acquisition unit to calculate the steering amount.

According to the vehicle control apparatus, the steering amount can be accurately calculated without data in which cross slopes of roads and road curvatures are related to each other.

What is claimed is:

1. A vehicle control apparatus, comprising:
a steering amount calculation unit which calculates a steering amount based on a current lateral deviation of a vehicle with respect to a target route;
a vehicle position acquisition unit which acquires a position of the vehicle; and
a past information acquisition unit which acquires a past lateral deviation, which is related to the position of the vehicle acquired by the vehicle position acquisition unit or a position ahead of the position of the vehicle, from a storage section in which the past lateral deviation is stored with the position of the vehicle being related to the past lateral deviation, wherein
the steering amount calculation unit feeds back the past lateral deviation acquired by the past information acquisition unit to calculate the steering amount, the past lateral deviation being detected before the current lateral deviation is detected, and
the vehicle control apparatus further comprises a correction unit which corrects the steering amount calculated by the steering amount calculation unit based on the past lateral deviation acquired by the past information acquisition unit.

2. The vehicle control apparatus according to claim 1, wherein
the steering amount calculation unit includes
a basic steering amount calculation unit which calculates a basic steering amount from a vehicle state quantity regarding a state of the vehicle and road information, wherein
the correction unit corrects the basic steering amount based on the past lateral deviation acquired by the past information acquisition unit to calculate the steering amount.

3. The vehicle control apparatus according to claim 2, wherein
- the storage section stores, in addition to the past lateral deviation, the steering amount obtained when the past lateral deviation is generated,
- the past information acquisition unit acquires, in addition to the past lateral deviation, the steering amount obtained when the past lateral deviation is generated from the storage section,
- when magnitude of the past lateral deviation acquired by the past information acquisition unit is equal to or more than a predetermined threshold value, the correction unit adds a correction amount having magnitude corresponding to the magnitude of the past lateral deviation to the basic steering amount to calculate the steering amount, and
- when the magnitude of the past lateral deviation acquired by the past information acquisition unit is less than the threshold value, a value obtained by adding the steering amount acquired by the past information acquisition unit or the correction amount used when calculating the steering amount acquired by the past information acquisition unit to the basic steering amount is used as the steering amount after the correction.

4. The vehicle control apparatus according to claim 1, further comprising:
- a lateral deviation detection unit which detects the current lateral deviation; and
- a storage unit which stores the current lateral deviation detected by the lateral deviation detection unit and the steering amount obtained when the current lateral deviation is detected in the storage section in a state where the current lateral deviation and the steering amount are related to the position of the vehicle.

5. The vehicle control apparatus according to claim 4, wherein
- when a previously set non-storage condition is met, the storage unit does not store the current lateral deviation and the steering amount.

6. The vehicle control apparatus according to claim 1, wherein
- the storage unit stores at least a lateral deviation of another vehicle and a steering amount obtained when the lateral deviation of the another vehicle is generated, in a state where the at least the lateral deviation of the another vehicle and the steering amount are related to a position of the another vehicle.

7. The vehicle control apparatus according to claim 1, wherein
- when a variation of the past lateral deviation stored in the storage unit is equal to or more than a predetermined threshold value, the steering amount calculation unit makes a contribution of the past lateral deviation in the calculation of the steering amount smaller than that in a case where the variation is less than the predetermined threshold value.

8. A vehicle control apparatus, comprising:
- a steering amount calculation unit which calculates a steering amount based on a current lateral deviation of a vehicle with respect to a target route;
- a vehicle position acquisition unit which acquires a position of the vehicle; and
- a past information acquisition unit which acquires a past lateral deviation, which is related to the position of the vehicle acquired by the vehicle position acquisition unit or a position ahead of the position of the vehicle, from a storage section in which the past lateral deviation is stored with the position of the vehicle being related to the past lateral deviation, wherein
- the steering amount calculation unit feeds back the past lateral deviation acquired by the past information acquisition unit to calculate the steering amount, and
- when a variation of the past lateral deviation stored in the storage unit is equal to or more than a predetermined threshold value, the steering amount calculation unit makes a contribution of the past lateral deviation in the calculation of the steering amount smaller than that in a case where the variation is less than the predetermined threshold value.

* * * * *